Feb. 27, 1934.  D. A. YOUNG  1,948,740
PORTABLE STROBOSCOPE
Filed Oct. 6, 1930
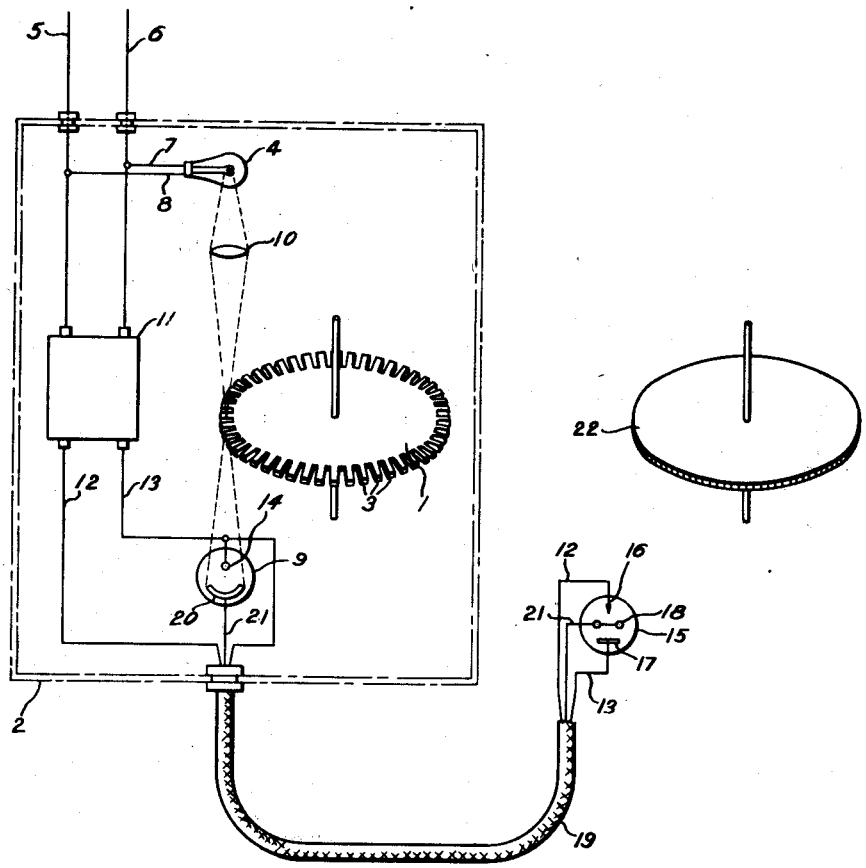
INVENTOR
*Douglass A. Young*
BY
ATTORNEY Patented Feb. 27, 1934

1,948,740

UNITED STATES PATENT OFFICE 1,948,740

PORTABLE STROBOSCOPE

Douglass A. Young, East Orange, N. J., assignor to Westinghouse Electric & Manufacturing Company, a corporation of Pennsylvania Application October 6, 1930. Serial No. 486,686

2 Claims. (Cl. 175—183)

My invention relates to apparatus for testing meters and has special relation to portable apparatus for stroboscopically comparing the speed of a meter disc with the speed of the disc of a standard meter.

An object of my invention is to provide apparatus of the above mentioned character, in which a grid-glow tube is caused to give off intermittent flashes of light in accordance with the speed of the standard-meter disc, whereby stroboscopic comparison may be made of the speed of the disc of the standard meter and the disc of the meter under test.

Another object of my invention is to provide apparatus, as described above, in which a source of high-frequency voltage is impressed upon the grid-glow tube to eliminate flickering of the tube due to alternations of standard low-frequency voltages.

A further object of my invention is to provide apparatus, as described above, which consists of comparatively few parts and is so constructed as to be easily portable.

These and other objects of my invention may be more readily understood by referring to the following description taken in conjunction with the accompanying drawing, in which:

The single figure is a schematic view of a portable testing set constructed in accordance with my invention.

Referring to the drawing, a standard meter having a rotatable disc-armature 1 is disposed in a casing 2, and the periphery of the meter disc 1 is slotted to form equi-distant projections 3. An incandescent lamp 4 is disposed above the disc 1 and is energized from a pair of conductors 5 and 6, connected to a voltage source of standard frequency, (not shown), through conductors 7 and 8.

A photo-electric cell 9, having an anode 14 and a cathode 20, is disposed beneath the meter disc 1. A condensing lens 10 is disposed between the lamp 4 and the periphery of the meter disc in such manner that a beam of light from a lamp 4 is concentrated on the projections 3 of the meter disc.

A frequency changer 11, which may be of any well-known type, such as a small motor-generator set, is disposed within the casing 2. One side of the frequency changer 11 is connected, through conductors 5 and 6, to a source of standard-frequency voltage. Conductors 12 and 13 are connected to the high-frequency side of the frequency changer. The anode 14 of the photo-electric cell 9 is connected, through conductor 13, to the high-frequency side of the frequency changer 11.

A grid-glow tube 15, having an anode 16, cathode 17, and a grid 18, is connected, by means of a flexible cable 19, to the casing 2. The anode 16 and the cathode 17 of the grid-glow tube are connected, respectively, to conductors 12 and 13 through the flexible cable 19. The cathode 20 of the photo-electric cell 9 is connected, by means of conductor 21, to the grid 18 of the grid-glow tube 15.

A disc member 22, of a meter to be tested, is provided, on its peripheral edge, with equi-distant indicia or markings which correspond to the projections 3 of the meter disc 1.

The operation of the testing apparatus is as follows:

The current and voltage coils (not shown) of the meter discs 1 and 22 are so connected that the same load is measured by the respective meters. When the meter disc 1 rotates, the projections 3 act as shutters to intercept the beam of light concentrated on the periphery of the disc 1 by means of the lamp 4 and the condensing lens 10. The resulting intermittent flashes of light caused by the above-mentioned shutter effect, are successively impressed on the photo-electric cell 9.

The anode 16 and the cathode 17 of the grid-glow tube 15 are connected to the high-frequency side of the frequency changer 11. The frequency impressed on the anode 16 and 17 is, in a preferred embodiment, from 1,000 to 1,500 cycles. The grid 18 is connected to the cathode 20 of the photo-electric cell 9 in such manner that the electrical impulses set-up within the photo-electric cell 9 are sufficient to cause the tube to break down and give off light which will flicker in synchronism with the impulses set up within the photo-electric cell, and the alternations of the high-frequency voltage. The flicker caused by the high-frequency voltage will be imperceptible but the flicker caused by the photo-electric cell may be used for stroboscopic comparison, as will be explained below.

In some instances, it may be desirable to place an amplifying unit in the circuit of the cathode of the photo-electric cell and the grid of the grid-glow tube.

The grid-glow tube is then moved into close proximity to the disc 22 of the meter to be tested. If the speed of the disc 22 is in synchronism with the disc 1, the marks on the peripheral edge of the disc 22 will appear to be stationary because of the well-known stroboscopic phenomena. If the disc 22 rotates faster than the disc 1, the markings on the peripheral edge will appear to move in one direction, and if the disc 22 rotates at a slower speed than the disc 1, the marks will appear to move in the opposite direction.

If the disc of the meter being tested is not in synchronism with the disc of the standard meter, the meter under test may be adjusted, in the usual manner, to give the correct speed.

A particular advantage of a testing unit constructed according to my invention is its simplicity and small number of parts, which make the unit easily portable.

In many instances, it is desirable to test the meter on the customer's premises. With the use of my invention an operator is enabled to connect the testing unit to the power line, adjacent to the meter to be tested. The use of the frequency changer enables the operator to use a grid-glow tube for stroboscopic comparison, regardless of the frequency of the power line leading to the meter to be tested.

I do not wish to be restricted to the specific arrangement of parts herein set forth, as it is evident that various modifications thereof will fall within the spirit and scope of my invention. I desire, therefore, that only such limitations shall be imposed as are indicated in the appended claims.

I claim as my invention:

1. In a portable stroboscopic watthour meter tester, a source of light, a photo-electric cell exposed thereto, a standard watthour meter having a movable armature disc, means on said disc for intermittently interrupting the light on said photo-electric cell, a grid glow discharge tube, a circuit whereby said tube is flashed by said photo-electric cell for stroboscopically observing the marked disc of a watthour meter to be tested, and a frequency changer for supplying high frequency alternating current to energize said circuit whereby the tester may be energized from the regular A. C. service mains.

2. In a portable stroboscopic watthour meter tester the combination of a flashing light source for stroboscopically observing the marked disc of a watthour meter to be tested, energizing means for said light source comprising means for flashing said light source in accordance with a test load applied to the watthour meter to be tested and a frequency changer whereby the tester may be conveniently energized from the usual alternating current service mains without interfering stroboscopic effects.

DOUGLASS A. YOUNG.